Patented June 2, 1953

2,640,817

UNITED STATES PATENT OFFICE 2,640,817

ANTISTATIC COATING FOR PLASTICS

Eleanor G. Sheridan, Chicago, Ill., Luther L. Yaeger, Hammond, Ind., and Johan Bjorksten, Chicago, Ill., assignors to Nash-Kelvinator Corporation, Kenosha, Wis., a corporation of Maryland No Drawing. Application July 26, 1948,
Serial No. 40,798

6 Claims. (Cl. 260—32.6)

This invention relates to dielectric substances, and more specifically to a surface treatment for minimizing or eliminating static electric charges on substances, substantially non-conductors for electricity.

Static electric charges are formed whenever impingement or friction occurs between substances of different dielectric constants. When a surface so charged is substantially a non-conductor of electricity, the static charges accumulate progressively. Such static charges are highly objectionable for many reasons, and have been, in fact, a major deterrent to the use of plastic substances in numerous industrial as well as domestic applications.

For example, static charges may cause electric sparks sufficiently potent to cause fires. In plastic fabrics or curtains they may cause attraction of such fabrics to other fabric surfaces in a manner to cause the material not to drape properly, but to take forms or shapes not desired by the designer or the user. Finally, static charges cause objects to attract suspended particles so strongly that they become covered by dust in a very short time. This is objectionable particularly in transparent display cases, but obviously is undesirable in almost all uses of plastics.

Previously, many methods have been used in endeavors to reduce static charges. Solutions or suspensions of electrolyte are effective, by rendering the surfaces in question conducting, so that static charges are promptly dissipated. However, such coatings are very temporary by their inherent nature. Combinations of nitrocellulose and ethyl cellulose have been recommended, but have not attained any commercial success due to the difficulty in obtaining the necessary adhesion to numerous of the practically important organic resins.

An object of the present invention is to reduce or minimize such static charges by new and more effective methods. Another object is to improve the surface characteristics of plastics. Other objects are new and useful chemical compositions and articles utilizing these. Further objects are methods and processes for destaticizing dielectric substances. Still further objects will become apparent as the following detailed description proceeds.

In accordance with our invention we apply to the dielectric material to be coated a surface covering comprising, as non-volatile constituents, solid, resinous polychloro biphenyls, and further, a polymer selected from the class consisting of resinous polymers and copolymers of acrylic acid, methacrylic acid and esters thereof, hereinafter for the sake of brevity referred to as "acrylates." The polychloro biphenyl and the acrylate are preferably employed in the proportions of 30 to 50% of the polychloro biphenyl to 70 to 50% of the acrylate. Biphenyls chlorinated to the extent of about 60% to about 70% of chlorine on their total weight are preferred for the purposes of this invention. We have found that a surface coating of the composition stated above when applied to plastics forms a very nearly astatic surface coating. While complete astaticity is not achieved, the charges will be slight and variable and can be further minimized to almost a vanishing point by the incorporation of certain amino type substances, as further described below.

The coatings of our invention are characterized by a surprisingly good adhesion to a variety of plastics. In particular, they are extremely adherent to polystyrene, and do not cause any turbidity, or other disturbance of its optical properties. This is important, because, while the invention is broadly applicable to a variety of plastics, the static accumulation is the most marked and most objectionable in polystyrene plastics.

The adhesion characteristics of the representative coating of this class described in Example 2 is shown in the following tabulation:

| | |
|---|---|
| Celluloid | good |
| Polymethyl methacrylate sheet | good |
| Poly vinylidene chloride sheet | good |
| Cellulose acetobutyrate | good |
| Shellacked glass | good |
| Polyvinyl chloride sheet | fair |

The adhesion tests were made by applying the composition of Example 2 by spraying, allowing to dry, making a cross in the resultant film with a pointed instrument, and pressing adhesive tape against the point thus weakened, and jerking off the tape. Any lack of adhesion would result in stripping of the film from the cross.

While the coatings described above have the characteristics of a superior antistatic composition for plastics, they are, as already stated, not completely astatic. No matter what proportion we use of the ingredients stated, on rubbing with another substance having a dielectric constant different from that of the coating, this will assume some slight charge, sometimes positive, sometimes negative, dependent not only on the material with which it has been in contact, but also on general atmospheric conditions and other influences not related to the composition of the coatings.

Where a more complete degree of freedom from static charges is necessary, as for example on dial covers for certain electronic instruments, we prefer to include in the coatings amine type static dissipating agents. For this purpose, we find any compound suitable, which is, or can be made, compatible with the coating compositions described, and which will provide free amine groups at the exposed surfaces of the article treated.

As examples of such amino compounds may be mentioned a proprietary cation active water-soluble quaternary ammonium salt sold by E. I. du Pont de Nemours and Company under the trade-name "Avitex R" which comprises the diethanol amide of lauric acid, or other compatible cation active amine compounds, further, a condensation product of fatty acids, such as stearic acid or lauric acid, and diethanol amine, described in U. S. Reissue Patent No. 21,530 to W. Kritchevsky, further, the amide of methacrylic acid and lauryl amine or propylene diamine and reaction products of aliphatic and aromatic polyamines with chlorine containing polymers particularly with polymers containing at least two chlorine atoms at one carbon atom and still soluble in organic solvents, such as toluene or carbon tetrachloride.

Generally, amine containing substances having free amino groups and compatible with the resins, proved to be suitable amino-type de-staticizers. By reacting amines with structural components of the resins employed, suitable readily incorporated amino compounds could be made. An example of this is a reaction product of polyamines heated with polychloro biphenyl sufficiently long to effect partial replacement of halogen with amino nitrogen, or reaction products of polyamines with acrylic or methacrylic acids the reactants containing more amino groups than necessary to cover the carboxyl groups present.

While the solvent employed is varied in accordance with the special application requirements in each case, certain types of solvent combinations are preferred in a very wide range of plastic applications.

Generally, we prefer to employ the solvents disclosed in the co-pending patent applications Serial Nos. 730,192, 730,193, 730,207, all filed February 21, 1947, and Serial Nos. 4,945, filed January 28, 1948, 6,568, filed February 5, 1948, and 23,392, filed April 26, 1948, because these solvents are effective for the substantially astatic film forming materials here contemplated, and are also inactive to polystyrene and related resins.

It may be stated that the preferred solvents are based largely on aliphatic alcohols, of which they contain at least 50% and preferably 75% and more. The term "aliphatic alcohol" we employ broadly, to include also alcohol ethers, having at least one free hydroxyl group, such as for example, ethylene glycol mono methyl ether, or methyl oxy propionic acids.

The following specific formulations for coatings are given to further illustrate embodiments of the invention. These examples are provided for the sole purpose of illustrations, and to make the application of the invention more convenient to those desiring to practice it. The specific chemicals or ranges of proportions given in the examples should not be construed in any sense of limitation. The parts in the formulas below are given by weight.

*Example 1*

| | Parts |
|---|---|
| Methyl methacrylate polymer | 2.5 |
| Polychloro biphenyl, resinous | 1.5 |
| Ethylene glycol mono methyl ether | 32 |
| Diacetone alcohol | 14 |

The above ingredients were mixed until fully homogeneous.

The resultant product is a thin liquid, readily applicable by spraying. This composition was sprayed onto resins of the following composition:

1. Polystyrene.
2. Methyl methacrylate polymer known to the trade as "Plexiglas."
3. Cellulose aceto butyrate.

On tests, the panels so treated were found to be substantially astatic.

*Example 2*

| | Per cent |
|---|---|
| Biphenyl chlorinated to 68% Cl$_2$ | 30 |
| Polymethyl methacrylate | 70 |

The above resin combination was dissolved in a solvent consisting of 10% dibutyl ketone, 75% ethylene glycol monomethyl ether, and 15% isopropanol.

The solution contained 15% non-volatile constituents.

The resultant resin solution was sprayed onto a surface of polymethyl methacrylate, and allowed to dry. The treated surface proved to have a markedly reduced tendency to attract dust, on exposure to household dust for a period of 60 days.

*Example 3*

| | Parts |
|---|---|
| Methyl methacrylate polymer | 2.5 |
| Polychloro phenol | 1.5 |
| An organic amine product known as "Avitex R" and sold by the E. I. du Pont de Nemours and Company which comprises the diethanol amide of lauric acid | .8 |
| Diacetone alcohol | 14 |
| Ethylene glycol monoethyl ether | 32 |

The ingredients were mixed, until a uniform solution resulted.

The solution was applied by dipping to panels of polystyrene, and allowed to dry. The panels were aged 3 days at 50° C. to remove solvent traces. The panels were then rubbed with cotton and with wool cloth respectively, each 20 seconds with friction against a wheel covered with the fabrics stated, and revolving at a rate of 150 R. P. M. The pressure of the panels against the wheel was by simple gravity contact, the weight of the panels being 4, 8, and 6 grams respectively, and their line of contact with the wheel having a width of 1".

The static charges were measured in an electronic voltage meter known as the "Davis statometer" and sold by the Davis Emergency Equipment Company. The results were as follows:

| Sample No. | Rubbed with wool | Rubbed with cotton | Rubbed with silk |
|---|---|---|---|
| | (Charges are all positive) | | |
| 1 | 0.0 | 0.0 | 0.0 |
| 2 | 1.2 | 0.1 | 0.0 |
| 3 | 0.0 | 0.0 | 0.0 |
| 4 | 0.1 | 0.0 | 0.0 |
| 5 | 0.0 | 0.1 | 0.0 |
| 6 | 0.1 | 0.0 | 0.0 |
| Bare polystyrene control | 200.0 | 120.0 | 80.0 |

AFTER 25 DAYS

| | | | |
|---|---|---|---|
| | (All charges positive unless indicated otherwise) | | |
| 1 | 0.4 | 0.0 | 0.1 |
| 2 | 1.2 | 0.4 | 1.0 |
| 3 | 0.4 | 0.0 | —0.1 |
| 4 | 0.1 | 0.0 | 0.0 |
| 5 | 0.6 | 0.0 | —0.1 |
| 6 | 0.1 | 0.0 | —0.1 |

It is thus seen that the total charges accumulated under the conditions stated are often zero, and in all cases are vastly less than those obtained with untreated polystyrene panels subjected to the same static generating treatments as the test samples.

Example 4

| | Percent |
|---|---|
| Fully chlorinated biphenyl | 36 |
| A resinous co-polymer of substantially equal parts of methyl methacrylate and methyl acrylate | 55 |
| Amide of methacrylic acid | 9 |

The above constituents were dissolved in a solvent consisting of 15% ethyl acetate, 20% ethylene glycol monoethyl ether, 55% ethylene glycol mono methyl ether, and 10% methanol.

The non-volatile content of the solution was 12%.

Panels of glass, methacrylate polymer, cellulose aceto butyrate, and polystyrene were dipped into the solution. Even after frictional contact with cotton or wool cloth, the static charge of the coating was less than 1 volt while the corresponding charges on the untreated panels ranged from 2½ volts up to 230 volts for the polystyrene.

Example 5

| | Percent |
|---|---|
| Biphenyl chlorinated to 68% chlorine content | 48 |
| Polyethyl methacrylate | 48 |
| Reaction product of polyvinylidene chloride, 94%, and tetra ethylene triamine 6% | 4 |

The ingredients were melted together and mixed, until homogenous. The composition was then sprayed with a steam heated spray gun, using air pre-heated to 250° F. at 80 lbs. pressure, onto a panel of poly-dichlorostyrene, which had been pre-warmed in an oven to 155° F.

The coating formed in this manner served the purpose of almost completely eliminating the static charge of the poly-dichlorostyrene, the slight residual charge being in the range of .2 to .6 v., negative.

Example 6

| | Percent |
|---|---|
| Biphenyl, chlorinated to a chlorine content of 60% | 30 |
| Polyisopropyl methacrylate | 70 |

These ingredients were dissolved in a mixture of 80% acetone, 10% Cellosolve acetate and 10% isobutanol.

The solid content of the solution was 10%.

The solution was spread with a .002" coating rod over a horizontal plate of glass, which had previously been greased with a silicone parting agent. The film thus obtained was used as the outermost layer in a laminate of an alkyd-styrene polyester type low pressure laminating resin, using glass fiber as the filler, a molding pressure of 15 lbs., and molding time of 60 minutes, and a temperature of 175° F. The catalyst employed for the resin stated above, which comprised the inner layer of the laminate, was 1% of benzoyl peroxide.

The laminates thus obtained were conspicuous for their tendency to accumulate static charges.

Example 7

| | Percent |
|---|---|
| Biphenyl chlorinated to a chlorine content of 64% | 18.4 |
| Polymethyl acrylate | 29.2 |
| Methoxy triglycol acetate | 42.2 |
| Tributyl aconitate | 10.2 |

The above ingredients were dissolved in a solvent mixture consisting of 10% ethylene glycol monoethyl ether, 10% diethylene glycol monomethyl ether, 5% 2-methyl 2,4 pentane diol monomethyl ether, and ethylene glycol monomethyl ether, 75%.

The resultant coating composition was applied by spraying and dipping to panels of phenol-formaldehyde resins, and shellac-coated glass surfaces. In both cases the tendency to accumulate static charges was successfully eliminated.

Example 8

| | Percent |
|---|---|
| Biphenyl chlorinated to a chlorine content of 68 % | 30 |
| Poly methyl methacrylate | 50 |
| Methoxy triglycol acetate | 10 |
| Trimethyl citrate | 8 |
| Condensation product of oleic acid and diethanolamine, obtained by heating these to a temperature of 150° C. for two hours in the presence of .05% sodium hydroxide | 2 |

The above composition was heated to a temperature of 320° F., at which temperature it was very low in viscosity. The panels to be protected were then dipped into this composition rapidly, to avoid softening of the dipped panels.

In this manner coatings were applied to panels of polystyrene, polymethacrylate, and to rods of polyvinylidene chloride. The material thus treated was found to have only a very slight indication of a positive charge.

With reference to the solvent employed in applications where the plastic treated is polystyrene, it is often particularly expedient to employ solvents comprising from 3 to 25% of a solvent selected from the group consisting of aliphatic ketones, toluene, and nitro-aliphatic substances other than nitromethane having a boiling range below 120° C.; 5 to 35% of a solvent selected from the class consisting of nitromethane aliphatic alcohols, and lactates having 1 to 5 carbon atoms; and 20 to 40% of a substance selected from the group consisting of diacetone alcohol, lactates having from 5 to 10 carbon atoms, gylcol ethers and esters.

With reference to the resin constituents, we may employ any of the halogenated biphenyls, which is of a resinous nature. While the chlorinated derivatives are preferred, we may use brominated, iodinated or fluorinated biphenyls, or biphenyls into which more than one of these halogen substituents have been introduced, the criterion of suitablility being the resinous nature of the said product.

As for the other resinous constituent stated, the methacrylates are generally preferred, but we may employ any of the resins selected from the group class consisting of polymers and copolymers of acrylic acid, methacrylic acid, and esters thereof.

A strange and unexpected phenomenon is that very much better results are obtained in overcoming static charges if all sides of an object are covered with the coatings of this invention, than if the treatment is confined to one side only of the object. This is true even of large objects, such as refrigerator doors, as shown by the following example.

Example 9

Four refrigerator doors of injection molded polystyrene were treated as follows:

Two of the doors were sprayed with the solution of Example 2 on both sides and were then allowed to dry at 120° F. They were then suspended from the ceiling in a room of ordinary dust content. The two other doors were similarly treated on one side only, and suspended adjacent to the previously mentioned doors.

After one month the amount of dust accumulated on the doors treated on both sides was negligible. On the doors treated on one side only, a great deal of dust had accumulated on the untreated sides, so as to give these a grey, unattractive appearance. However, on these second doors, considerable dust had accumulated on the treated side as well. Much of this dust seemed arranged in a pattern on the "corona discharge" type, in areas radiating from some corner or protruding portion of the door. The impression was gained that a streaming pattern was formed from such protruding points of the surface to the untreated areas on the other side of the door, and that dust was accumulating in a definite pattern correlated with the lines of force in this electrostatic field.

Other objects, for which this treatment has proven of substantial merit, include radio cabinets, toys, display boxes, fluorescent light fixtures, and the like.

In general, the surface coating occupies a minor proportion of the bulk of the article treated with it. Even in the cases where application is made of a heated solid composition in accordance, for example, with Examples 5 or 8, the antistatic composition applied preferably comprises less than 5% of the total bulk of the article.

As shown in numerous examples, the compositions of this invention are capable of being applied directly from the solid state, so that the solvent employed is a matter of expedience, and is not an essential part of this invention.

The amount of amine type destaticizing agent employed may be varied from about ¼% to about 40% on the total solid content composition, the preferred range being between 5% and 25%.

The plasticizer, if any, is employed in amounts varying from 5% to 60%. For example, a plasticizer combination used advantageously in the high percentage range consists of 44.5% of triethyl citrate and 14% of methoxy triglycol acetate; the resins in the composition consisting of 19% of chlorinate biphenyl (68% chlorine) and 22.5% of polymethyl methacrylate.

It is generally preferable to employ plasticizers compatible with the other ingredients stated, and which contain at least one free oxy group. Aconitates are also favorable in this regard. We may further employ esters of large molecular alcohols and oxy-acids, such as triethylene glycol monoethyl ether mono hydroxy acetate, octyl lactate, butyl ricinoleate, and the like.

While reference has been made by way of example and not of limitation to certain specific ingredients and proportions, it is understood that other ingredients or excipients may be added, without departing from the scope of the invention. For examples, coloring agents, fillers, binders, excipients, and the like may be added to the coatings.

It is thus apparent that the invention is of a broad scope, and is not to be limited except by the claims, in which it is our intention to cover all the patentable subject matter of this invention as broadly as possible, in view of prior art.

Having thus disclosed our invention, we claim:

1. An anti-static coating composition comprising in combination: 30 to 50% of solid resinous polychloro biphenyl, 60 to 70% of the weight of said polychloro biphenyl being attached chlorine; 70 to 50% of a polymer selected from the class consisting of polymers of esters of methacrylic acid formed from alcohols containing one to three carbon atoms; and from about ¼% to about 40% of diethanol amide of lauric acid.

2. An article coated with the composition of claim 1.

3. An anti-static coating composition comprising in combination: 30 to 50% of solid resinous polychloro biphenyl, 60 to 70% of the weight of said polychloro biphenyl being attached chlorine; 70 to 50% of a polymer selected from the class consisting of polymers of esters of methacrylic acid formed from alcohols containing one to three carbon atoms; and from about ¼% to about 40% of diethanol amide condensation product of oleic acid.

4. An article coated wiht the composition of claim 3.

5. An anti-static coating composition comprising in combination: 30 to 50% of solid resinous polychloro biphenyl, 60 to 70% of the weight of said polychloro biphenyl being attached chlorine; 70 to 50% of a polymer selected from the class consisting of polymers of esters of methacrylic acid formed from alcohols containing one to three carbon atoms; and from about ¼% to about 40% of amine type destaticizing agent consisting of a substance selected from the group consisting of diethanol amide of lauric acid and diethanol amide condensation product of oleic acid.

6. An article coated with the composition of claim 5.

ELEANOR G. SHERIDAN.
LUTHER L. YAEGER.
JOHAN BJORKSTEN.

References Cited in the file of this patent

UNITED STATES PATENTS

| Number | Name | Date |
|---|---|---|
| 2,137,636 | Barrett | Nov. 22, 1938 |
| 2,169,366 | Meigs | Aug. 15, 1939 |
| 2,190,776 | Elingboe et al. | Feb. 20, 1940 |
| 2,211,689 | Dittmar | Aug. 13, 1940 |
| 2,238,694 | Graves | Apr. 15, 1941 |
| 2,318,780 | Humphrey | May 11, 1943 |
| 2,332,461 | Muskat | Oct. 19, 1943 |
| 2,403,960 | Stoops et al. | July 16, 1946 |
| 2,463,282 | Kang | Mar. 1, 1949 |

FOREIGN PATENTS

| Number | Country | Date |
|---|---|---|
| 757,786 | France | June 30, 1933 |
| 514,427 | Great Britain | Nov. 8, 1939 |
| 515,565 | Great Britain | Dec. 8, 1939 |

OTHER REFERENCES

Strain et al.: pp. 382-387, Ind. & Eng. Chem., Apr. 1939.